(No Model.)

J. K. STARLEY.
ANTI FRICTION BEARING FOR VELOCIPEDES.

No. 351,001. Patented Oct. 19, 1886.

WITNESSES.
W. F. Lovejoy
E. S. Benson.

INVENTOR.
John Kemp Starley
By Charles E. Pratt
Atty

UNITED STATES PATENT OFFICE.

JOHN KEMP STARLEY, OF COVENTRY, COUNTY OF WARWICK, ENGLAND, ASSIGNOR TO THE POPE MANUFACTURING COMPANY, OF HARTFORD, CONNECTICUT.

ANTI-FRICTION BEARING FOR VELOCIPEDES.

SPECIFICATION forming part of Letters Patent No. 351,001, dated October 19, 1886.

Application filed August 9, 1886. Serial No. 210,379. (No model.) Patented in England December 3, 1880, No. 5,046.

*To all whom it may concern:*

Be it known that I, JOHN KEMP STARLEY, of Coventry, in the county of Warwick, England, have invented certain new and useful Improvements in Anti-Friction Bearings for Velocipedes and other Carriages, applicable also to the bearings of journals or axles in other machinery, for which, or a substantial part thereof, I obtained British Letters Patent No. 5,046, dated December 3, 1880, of which the following is a specification.

My improvements relate to that class of bearings in which are interposed between the bearing-surfaces of the shaft or axle or a sleeve thereon and the bearing-surfaces in the box or hub one or more series of rollers or intermediate bodies capable of rotation for the purpose of substituting rolling contact for sliding friction in such bearings, and more particularly to that division of this class of bearings in which there is provision for the approach of one or more of the bearing-surfaces toward the others, by which the annular space in which the rollers travel may be contracted and the bearing be readily adjusted to compensate for wear; and the nature of my invention will be readily understood from the following description, taken in connection with the accompanying drawings, in which—

Figure 1:
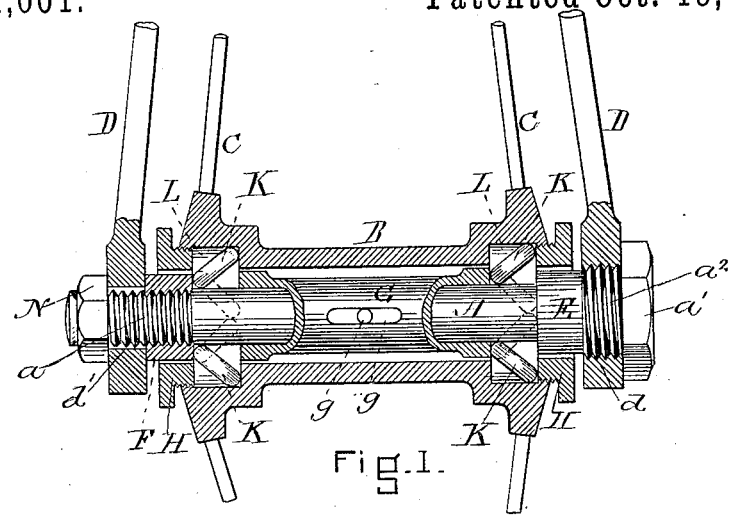
Figure 2:
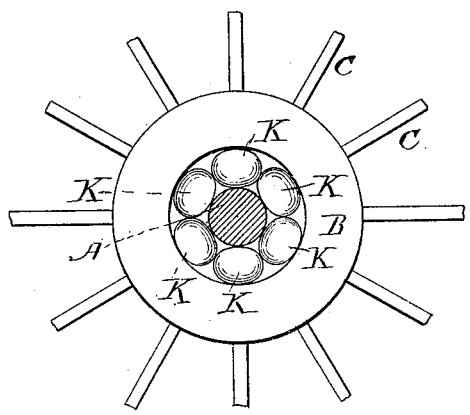
Figure 4:
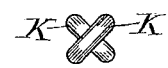
Figure 3:
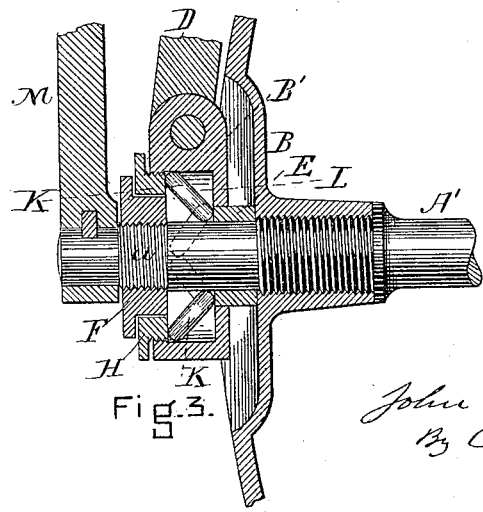

Figure 1 represents in vertical section the hub of a bicycle rear wheel and part of the rear forks, with the rear-wheel axle in elevation, embodying my improvements in one form. Fig. 2 shows in end elevation the same hub with cap removed, rollers in place, and axle in cross-section. Fig. 3 shows a bearing for one side of a bicycle front wheel in which the axle, instead of being free as in Figs. 1 and 2, is fixed in the wheel, this showing the application of my improvements in a slightly-modified form. Fig. 4 shows two of my improved rollers in position as they would appear if arranged on a level plane, as they are in the other figures.

The same letters represent the same parts in the different figures.

A is an axle, which, as in Fig. 1, may be in the form of a rear wheel-pin threaded at one end, $a$, having a head at the other end, $a'$, and having a threaded part of larger diameter at $a^2$.

B is the hub of the rear wheel, having a cylindrical middle part with flanges at either end for the reception of the spokes C.

D D are the rear forks, one of which may be threaded on the part $a^2$ of the axle A, and the other free on the part $a$.

E may be either a sleeve on the axle A, or a part of it, formed of larger diameter, so as to present a shoulder, but which is fixed or secured to the axle so as not to revolve upon it.

F is a sleeve of cylindrical form, threaded internally to fit a screw upon the threads on the part $a$ of the axle A, and also presenting a shoulder toward the middle of the axle.

G is a sleeve on the middle part of the axle A, free to move endwise thereon, but prevented from revolving thereon by means of the slot $g$ and stud $g'$, and presenting at its ends shoulders opposite to and corresponding with the shoulders on E and F.

H H are caps or cylindrical parts of the bearing-box, surrounding freely the parts E and F, and threaded exteriorly to fit internal screw-threads in the flanges of the hub or bearing-box B, and presenting on their inner ends shoulders toward the middle of the axle, and having on their outer ends means of turning them so as to screw them farther into or out of the hub or bearing-box. In the hub or bearing-box are shoulders opposite to and corresponding with those on the ends of the caps H H, and an annular cylindrical space, L, is left when the parts are in position between the shoulders described and around the axle, in which space I place the rollers or disks K K. These disks K K may be in the form of spherical zones or middle frusta of prolate spheroids, or similar forms having the length, by preference, much less than the diameter, and, by preference, with rounded corners. I place these disks in each annular space at an angle of inclination to the axis of about forty-five degrees and in two series, each disk of each series alternating with one of the other series of opposite inclination, the arrangement of each part or one of each series being shown in Fig. 4 as it would appear in elevation on a horizontal plane. The diameter of these disks is greater than the distance between the bearing-surface on the axle and the bearing-surface in the box, which are substantially parallel with each other and greater than the distance between the two opposite shoulders, but substantially equal to the diagonal of the parallelogram formed in section by the opposing shoulders and cylindrical bearing-surfaces, as shown in Figs. 1 and 3. The disks and bearing-surfaces may be of hardened steel, and the parts may be easily calculated with reference to each other as to dimensions and spaces and the number and diameter of the disks.

In applying these improvements to the front wheels of bicycles or other wheels having axles fixed therein, as A' in Fig. 3, a box, B', is used separate from the wheel. In this Fig. 3 D may be the front fork of the bicycle and M the crank, and, of course, with this construction there would be another independent box, B', on the other side of the wheel.

In applying these bearings to tricycles or to different positions in machines slight modifications of arrangement might be desirable, and would be obvious to any mechanic.

In adjusting these bearings after they have been worn by use the operation will be as follows: In the form of loose wheel, as shown in Fig. 1, the set-nut N would be loosened and the sleeve F turned so as to advance upon the screw-thread sufficiently toward the middle of the axle to set up the rollers bearing against the shoulder in the hub B, which would set the hub B over toward the other end of the axle and against the rollers bearing against its shoulder and against the shoulder on the sleeve or enlargement E, until all the parts had a proper bearing. In like manner the caps H would be turned and caused to advance by their screw-threads into the hub on either side until the rollers bearing against the shoulders in these caps and against the shoulders of the sleeve G should have a proper bearing; or, as is obvious, this latter adjustment may be done by moving one of the caps H. The method of adjustment would be the same in the form of a fixed axle as shown in Fig. 3, the sleeve F being turned up to adjust one series of rollers and the cap H to adjust the other, or practically, wear being for the most part even on all the disks and surfaces, the adjustment may be accomplished by turning one cap or one sleeve only. It is obvious that the adjusting parts may either be secured in position by a lock-nut, as N, in Fig. 1, or by a sufficiently-tight fit of the screw-threads, or in any other manner. It is also obvious that two sets of disks may be used in the box B', or on either side the wheel where the axle is fixed, and that the form of construction shown in Fig. 1 might be equally well used in pedals.

It is obvious that modifications may be made in form and arrangement of the parts without departing from the spirit of my invention; and I do not mean to limit myself precisely to the form of things herein shown and described.

I am aware that bearings of the class herein described have been constructed having plain cylindrical rollers and rounded-ended rollers; and conical-ended rollers and spherical rollers have been heretofore constructed and shown, so that the axes of revolution of the rollers were parallel with the axis of the shaft, journal, or axis about which they were placed; also that in some of such bearings means of adjustment for wear have been provided, and I do not, therefore, claim these things or their combination in a bearing; but

I claim as new and of my invention—

1. In an anti-friction roller-bearing, a series of prolate spheroidal rollers or disks, with their axes inclined to the axis of the shaft or axle, essentially as set forth.

2. In an anti-friction roller-bearing, a series of prolate spheroidal rollers with their axes inclined to the axis of the wheel, and another series of similar rollers with their axes similarly inclined, but in an opposite direction, and placed alternately between the rollers of the other series, essentially as set forth.

3. In an anti-friction bearing, the combination of bearing-surfaces in box and axle, substantially perpendicular to and parallel with the axis of the shaft or axle, one or more of said perpendicular surfaces being adjustable, and one or more series of prolate spheroidal rollers having their axes inclined at an angle with the axis of the shaft or axle, essentially as set forth.

4. The combination, in an anti-friction bearing, of a rectangular cylindrical recess in a hub or bearing-box, a rectangular cylindrical recess on an axle or between sleeves thereon, a cap threaded in the hub or box, and a sleeve threaded on the axle, two rows of opposingly-inclined and alternately-placed roller-disks and their connecting parts, constructed and combined to operate essentially as set forth.

JOHN KEMP STARLEY.

Witnesses:
T. CARTER,
LOUIS GLASELER.